United States Patent [19]
Ando et al.

[11] Patent Number: 5,878,668
[45] Date of Patent: Mar. 9, 1999

[54] PROCESS FOR PREPARING STAMP

[75] Inventors: Yoichi Ando, Sagamihara; Hajime Toda, Machida; Koichi Hirano, Yokohama; Hisami Tamano, Machida, all of Japan

[73] Assignee: Mitsubishi Pencil Kabushiki Kaisha, Tokyo, Japan

[21] Appl. No.: 888,189

[22] Filed: Jul. 3, 1997

Related U.S. Application Data

[62] Division of Ser. No. 365,124, Dec. 28, 1994, Pat. No. 5,741,459.

[30] Foreign Application Priority Data

| Dec. 28, 1993 | [JP] | Japan | 5-350716 |
| Dec. 28, 1993 | [JP] | Japan | 5-350717 |
| Jan. 25, 1994 | [JP] | Japan | 6-006189 |

[51] Int. Cl.⁶ .......................................... B41K 1/50
[52] U.S. Cl. ........................ 101/379; 101/368; 101/401.1
[58] Field of Search .................... 101/368, 379, 101/401.1

[56] References Cited

U.S. PATENT DOCUMENTS

| 3,315,601 | 4/1967 | Borack | 101/368 |
| 3,742,853 | 7/1973 | Landsman | 101/401.1 |
| 3,836,624 | 9/1974 | Ferris | 101/401.1 |
| 4,064,205 | 12/1977 | Landsman | 101/401.1 |
| 5,172,131 | 12/1992 | Crystal et al. | 400/241.1 |
| 5,253,581 | 10/1993 | Miki et al. | 101/121 |
| 5,611,279 | 3/1997 | Ando et al. | 101/401.1 |

*Primary Examiner*—Edgar Burr
*Assistant Examiner*—Amanda B. Sandusky
*Attorney, Agent, or Firm*—Darby & Darby

[57] ABSTRACT

On the surface of an ink-permeable sponge material having open cells, a melted portion and an unmelted portion are formed by a thermal head printer controlled by a memory processor for desired imprint data to prepare a stamp having the unmelted portion as an ink oozing imprint surface. Furthermore, a stamp material plate comprising the tape-like sponge material is wound up in the form of a roll and then received in a cassette case, and a stamp material cartridge comprising this cassette case is mounted in a cartridge receiving section of the thermal printer capable of printing in a tape form. A print image set by input from a keyboard or external input is printed on the stamp material comprising the sponge material fed from the cartridge by the thermal head, while the stamp material is pressed, to form a concave having a depth of 0.01 mm or more, thereby preparing a print plate for a stamp having a suitable length.

A process for preparing a stamp of the present invention comprises simple steps, and therefore the high-quality stamp can be promptly provided.

1 Claim, 5 Drawing Sheets

FIG.3
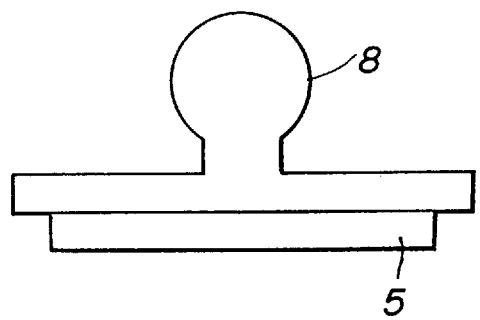
FIG.4
A B
FIG.5
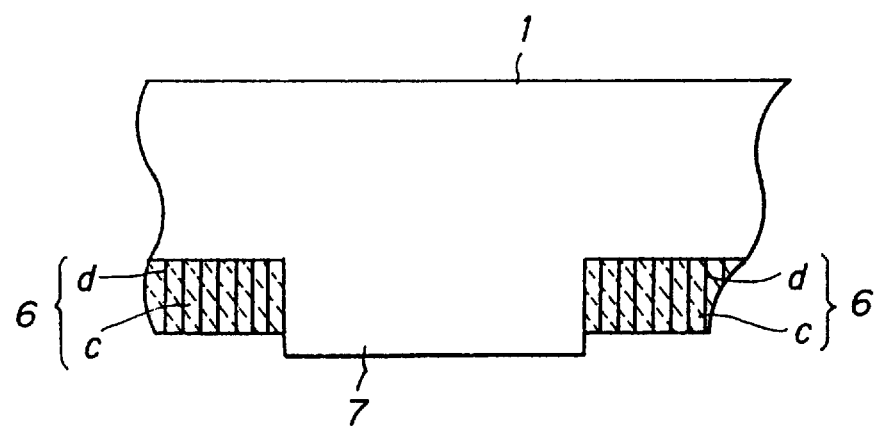

PROCESS FOR PREPARING STAMP

This is a division of application Ser. No. 08/365,124, filed Dec. 28, 1994, now U.S. Pat. No. 5,741,459.

BACKGROUND OF THE INVENTION (i) Field of the Invention

The present invention relates to a stamp and a process for preparing the stamp. More specifically, it relates to a stamp comprising a sponge material having open cells which can be repeatedly used for stamping without replenishing the ink with which the sponge material has been permeated, and an improvement of a process for preparing the stamp.

(ii) Description of the Related Art

In order to save the labor of applying a stamp ink onto the surface of a stamp every time stamping is done, the stamp beforehand permeated with the stamp ink has been used in which a sponge rubber having open cells is employed as a stamp material. Japanese Patent Application Laid-open No. (Sho) 60-193686 discloses a process for preparing a stamp which comprises depressing, thrusting and hardening the whole surface of a sponge in a concave state, except a portion for imprint formation, by a heating type extrusion process, so that the convex portion of the sponge becomes the portion which is the ink absorbing portion and can be used for the imprint formation. Furthermore, Japanese Patent Application Laid-open No. (Sho) 50-155323 discloses a method for manufacturing a stamp by pressing a porous material against a heating plate. However, this method requires a mold as the heating plate and the labor of sculpturing or etching characters, symbols and figures on the mold.

In addition, Japanese Patent Application Laid-open Nos. (Sho) 57-136652 and 49-7003 disclose a method for manufacturing a stamp which comprises coating the surface of a sponge material with a photopolymerizable liquid resin, irradiating the resin with ultraviolet rays through a positive film put thereon to bring about a photopolymerization reaction, and then washing the resin to remove the unreacted resin, thereby exposing the surface of the sponge material under the removed portion. Moreover, in Japanese Utility Model Laid-open No. (Sho) 52-71710, there is disclosed a plate stamp obtained by a similar method using a negative film. However, these methods inconveniently have intricate steps such as the formation of the negative or the positive film, coating of the resin, the photopolymerization and water washing. Furthermore, in Japanese Patent Application Laid-open No. (Hei) 3-96383, there is a description of melting the surface of a sponge directly by a thermal head, but its detailed disclosure is not present anywhere.

As described above, the conventional method for manufacturing the stamp having the open cells takes a good deal of labor and has intricate steps, and a method using a thermal head is not described in detail. Thus, a process for preparing a stamp capable of providing a sharp imprint has been desired.

On the other hand, a label word processor for making labels (hereinafter referred to as "the label word processor") can easily make labels. The label word processor is equipped with a keyboard for input and a display section comprising a liquid crystal display and the like; an internal font is printed in accordance with a command input from the keyboard or data input from the outside with the aid of the heat from the thermal head.

As shown in FIG. 9 attached hereto, a label tape cartridge 41 which can be used in this label word processor comprises a label tape 43 wound around a core 42, a feed core 44, a thermally transferrable ink ribbon 46 wound around a winding core 45, and a pressing member 47 received in a cassette case 48. Furthermore, as shown in FIG. 10, the label tape 43 comprises a tape base 43a, an adhesive layer 43b applied on its back, and a protective tape layer 43c laminated thereon. Another type of label word processor is also present in which a thermosensitive layer is formed directly on the tape base and printing is made by the utilization of a thermal head.

According to this label word processor, characters or the like are input from the keyboard, and a print content is confirmed on a display such as a liquid crystal display and the thermally transferrable ink layer 49 is transferred to the tape base 43a by the thermal head (not shown) to obtain the label tape. The ink ribbon 46 is melted and pulled out while the characters or the like are transferred to the label tape 43, thereby forming a label tape having a suitable length, the thus formed label tape being cut by a cutter (not shown). When the protective tape layer 43c is peeled, the cut label can be stuck on an object.

In the label word processor for making such a label tape, the length of the tape can usually be automatically set on the basis of a tape width and the input data, and a character size and a space between the characters can be automatically set in compliance with the set tape length. Thus, a label tape having a good finish can be easily manufactured.

However, in the case of the label manufacture by such a label word processor, the label tape itself is thick, which is obstructive, and the appearance of the print with the label on a paper is poor. In addition, since the label tape is usually made of a PET film, it is inconveniently difficult to write on the label tape with writing implements.

SUMMARY OF THE INVENTION

The present invention is intended to solve the above-mentioned problems, and an object of the present invention is to provide a process for preparing a stamp having open cells which comprises simple steps and which uses a simple apparatus. Another object of the present invention is to provide a stamp having open cells from which a sharp imprint can be obtained. Furthermore, in view of the problems with conventional stamp manufacturing technique, the present invention includes the technique of manufacturing labels by a label word processor as a fundamental conception. Still another object of the present invention is to provide a process for preparing a stamp which can easily prepare the stamp having a good finish by the use of a thermal printer capable of printing in a tape state as in a label word processor. A further object of the present invention is to provide a stamp material cartridge (c.f. FIG. 6B) for use in this process.

The present inventors have intensively researched to achieve the above-mentioned objects, and as a result, it has been found that the mirror image of a desired imprint can be extremely easily obtained on a sponge sheet by forming a melted portion and an unmelted portion, and then depressing the melted portion on either surface of the sheet of the sponge material having open cells using the thermal head of a thermal printer to close the cells. As a consequence, a stamp and a process for preparing the stamp of the present invention are achieved. A cartridge for receiving the stamp material for use in the preparation process can also be provided, and this forms the present invention.

A process for preparing a stamp of the present invention comprises the step of passing a sheet-like stamp ink-permeable elastic resin stamp material having open cells between a platen and a thermal head of a thermal printer controlled by a processor for desired imprint data, while pressing the stamp material, whereby an imprint mirror image comprising a concave melted portion and an unmelted portion maintaining the open cell state is printed on the surface of the stamp material to form the print surface having the melted portion as a stamp ink non-oozing portion and the unmelted portion as a stamp ink oozing portion.

In forming the print image, a portion of the foam surface having open cells is melted and depressed from the original surface, the depression caused by the collapse of the open cell foam structure due to the melting of the cell walls. When the terms "melting" or "melted" are used in the specification and claims, the references is to this portion which is depressed. Obviously, when the heating means are withdrawn, the depressed portion resolidifies. The unmelted portion remains at the original surface level, and is thus raised from the depressed portion, and when the term "unmelted" is used in the specification and claims, the reference is to this open cell surface portion which remains solid both during the heating phase, and subsequently. The image to be viewed on using the stamp can be either the melted or the unmelted portions, depending on whether reverse imaging is used. The melted portion will not be oozing with the stamp ink on stamping, while the unmelted portion is oozing with the stamp ink on stamping.

Preferable conditions for pressing the stamp material between the thermal head of the thermal printer and the platen are such that the thickness of the pressed stamp material is in the range of 95 to 30% of that of the unpressed stamp material, with the result that the depression of the melted portion below the unmelted portion is in the range of 0.01 to 0.5 mm. The preferable stamp material is a sponge sheet made of at least one material selected from the group consisting of a natural rubber, synthetic rubber and synthetic resin; or it is a polyolefin foamed sheet having a steric net structure of fine open cells, an average air bubble diameter of 2 to 10 $\mu$m, a porosity of 30 to 80%, a melting temperature of 50° to 150° C. and a thickness of 0.5 to 10 mm.

As one embodiment of the preparation process of the present invention, a stamp ink-permeable sheet-like elastic resin stamp material having the open cells is wound in a roll form, and the roll is then mounted in a cartridge receiving section of a thermal head printer capable of printing on a tape form. Next, in accordance with a command from a processor for desirable imprint data, the stamp material is fed from the cartridge receiving section and passed through between the thermal head and the platen, while pressed therebetween, to print an imprint mirror image comprising a concave melted portion, and an unmelted portion maintaining the open cell state on the surface of the stamp material, thereby forming the print surface from the melted portion as an ink non-oozing portion and the unmelted portion as an ink oozing portion.

In accordance with other preferable embodiments of the preparation process of the present invention, at least the surface of the stamp material which comes in contact with the thermal head may be provided with an adhesion prevention layer so that sliding properties are assured between the stamp material and the thermal head; or a thin film sheet having the adhesion prevention layer may be interposed between the thermal head and the stamp material to assure the sliding properties between the stamp material and the thermal head at the time of the heat generation by the thermal head. Alternatively, the surface of the thin film sheet which comes in contact with the stamp material may be coated with a thermally meltable ink which can be melted by the selective heat generation of the thermal head to permeate into the surface layer of the stamp material, and melt the surface layer of the stamp material, since the ink selected will have a higher melting temperature than the stamp material. In this connection, the adhesion prevention layer preferably is a layer containing a silicone resin.

The stamp material cartridge of the present invention is characterized by being capable of winding the stamp ink-permeable tape-like elastic resin stamp material having the open cells, and receiving therein the roll, so that the stamp material may be fed to the cassette case.

BRIEF DESCRIPTION OF THE DRAWINGS

FIG. 3 shows a stamp comprising the engraved foamed polyethylene sheet which is attached to a mount;

FIG. 4 shows an example of an imprint;

FIG. 5 shows an enlarged view of a stamp ink-permeated portion and a non-permeated portion;

Explanation of Symbols

Figure 1A:
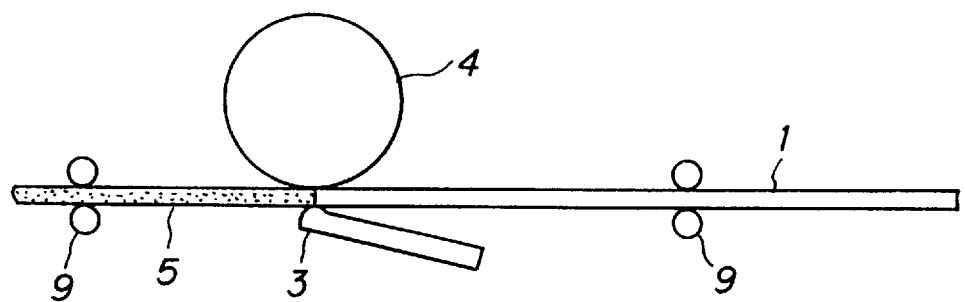
FIG. 1A and FIG. 1B show each a thermal printer equipped with a thermal head.

1 . . . Stamp material (foamed polyethylene sheet)
2 . . . Thermally meltable ink sheet
3 . . . Thermal line head
4 . . . Platen roller
5 . . . Stamp
6 . . . Permeated stamp ink non-oozing portion
7 . . . Permeated stamp ink oozing portion
8 . . . Mount
9 . . . Guide roll
a . . . Thermally meltable ink
b . . . PET film
c . . . Thermally meltable ink permeated portion
d . . . Melted portion
A . . . Thermal printer
B . . . Stamp material cartridge
12 . . . Thermal head
13 . . . Cartridge receiving section
20 . . . Stamp material
30 . . . Stamp

DETAILED DESCRIPTION OF PREFERRED EMBODIMENTS

Examples of a process for preparing a stamp of the present invention will be described.

A first process in accordance with the present invention comprises the step of passing a stamp ink-permeable sheet-like elastic resin stamp material having open cells between the platen and the thermal head of a thermal printer controlled by a memory processor for desired imprint data to form a melted portion and an unmelted portion on the stamp material. In the melted portion of the stamp material, the surface is melted, and the open cells adjacent to each other in the thickness direction of the stamp material are crushed and closed, so that the melted portion becomes an ink non-oozing portion, while the unmelted portion becomes an ink oozing portion, with the melted portion depressed so as to form a stamp surface.

Preferably, the memory processor for the desired imprint data is a word processor, and the stamp material is a resin sheet having the open cells. Furthermore, when a space between the thermal head and the platen is set so as to be smaller than the thickness of the stamp material, the melted portion can be depressed. A depression of the melted portion below the unmelted portion is in the range of 0.01 to 0.5 mm, but in case fine characters are to be formed on the stamp surface, the depression is preferably about 0.1 mm.

A second process in accordance with the present invention comprises the step of superposing a thermally meltable ink sheet upon the surface of a stamp ink-permeable sheet-like elastic resin stamp material having open cells, and then melting the stamp material by the use of a thermal printer controlled by a memory processor to provide the desired imprint data. A thermally meltable ink, to form a white-black reverse mirror image of an imprint on the surface of the stamp material, is applied to the surface whereby, on the stamp surface, the thermally meltable melted portion becomes a stamp ink non-oozing portion and the thermally meltable ink unmelted portion becomes a stamp ink oozing portion.

Here, the meltable ink permeates into the open cells in the surface layer of the stamp material, and since the melting point of the ink is higher than that of the stamp material, the meltable ink melts the stamp material. Furthermore, the open cells adjacent to each other in the thickness direction of the stamp material are crushed and closed, so that the melted portion on the surface of the stamp material is depressed. In this case, the depression of the melted portion from the unmelted portion is 0.01 mm or more, and the stamp material is a sponge sheet of a rubber or a plastic. In addition, the memory processor for the desired imprint data is a word processor.

A third process of the present invention comprises the step of installing a stamp material cartridge receiving a roll of a stamp ink-permeable tape-like elastic resin stamp material having open cells, so that the stamp material may be fed, and then forming a print image on the tape-like stamp material fed from the cartridge by a thermal head printer controlled by a memory processor for desired imprint data. Needless to say, this third process may be combined with one of the above-mentioned preparation processes.

The stamp material cartridge of the present invention receives the roll of the stamp ink-permeable tape-like elastic resin stamp material having open cells so that the stamp material may be fed to a cassette case.

Any material is acceptable as the stamp ink-permeable sheet-like elastic resin stamp material having open cells which can be used in the preparation process of the present invention, so long as it is a sheet having the open cells and an excellent stamp ink self-holding ability, i.e., the so-called sponge sheet. Examples of such stamp material include sponge rubbers of natural rubbers and synthetic rubbers, and synthetic resin foams, for example, plastic foams such as polyurethane foams, polystyrene foams, polyethylene foams, polypropylene foams, vinyl chloride foams, EVA foams and ABS foams. With regard to the shape of the stamp material, the surface of the stamp material on which the imprint is formed is required to be flat, and it is in the form of a plate, a sheet or a film. From the viewpoints of the permeation properties of the stamp ink and the ease of the stamp formation by the heat generation of the thermal head, there can be used the synthetic resin foamed sheet having a steric net structure of fine open cells, an average cell diameter of 2 to 10 $\mu$m, a porosity of 30 to 80%, a melting temperature of 50° to 150° C. and a thickness of 0.5 to 10 mm. Preferably, a polyolefin foam is used. Furthermore, the surface of the stamp material can be coated with an adhesion prevention layer of silicone resin or the like, which can prevent stamp formation failure due to the adhesion of the thermal head to the stamp material and a corresponding increase in the friction coefficient.

If a stamp material 20 which can be used in the third process has the form of a tape and a thickness of 2.0 mm or less, the stamp can be formed with the thermal printer of a conventional label word processor, and the thickness of the stamp is preferably about 1.5 mm in order to achieve acceptable strength of the stamp material, amount of permeated ink and performance of the printer.

The memory processor for the desired imprint data which can be used in the preparation process of the present invention is, for example, a personal computer or a word processor, and from the imprint data of built-in characters, symbols, figures and the like, desired imprint data are input and indicated through a keyboard or the like to obtain an external output, and by this external output, the heat generation of the thermal head of the thermal printer is controlled. With regard to the input, the data can be read in by the use of a scanner or a CCD camera, or they can be synthesized with the data input from the keyboard.

The thermal printer which can be used in the preparation process of the present invention is not different from a usual thermal printer in principle, and the usable thermal printer is equipped with a word processor having a function for reversing the white-black of a mirror image of the character, symbol, or figure and a thermal head printer compatible with the sheet of the stamp material which is thicker than usual paper.

The thermal head which can be used in the preparation process of the present invention is the same type of thermal head as used in a thermosensitive recording device or a heat transfer recording device, in that many heating elements are arranged on the thermal head to selectively generate heat to melt a portion of the surface of the sheet-like stamp material.

In the preparation process of the present invention, there is an embodiment where the sheet-like stamp material is passed between the thermal head and the platen, and an embodiment where the platen (board) and the stamp material are fixed and the thermal head moves.

Figure 6A:
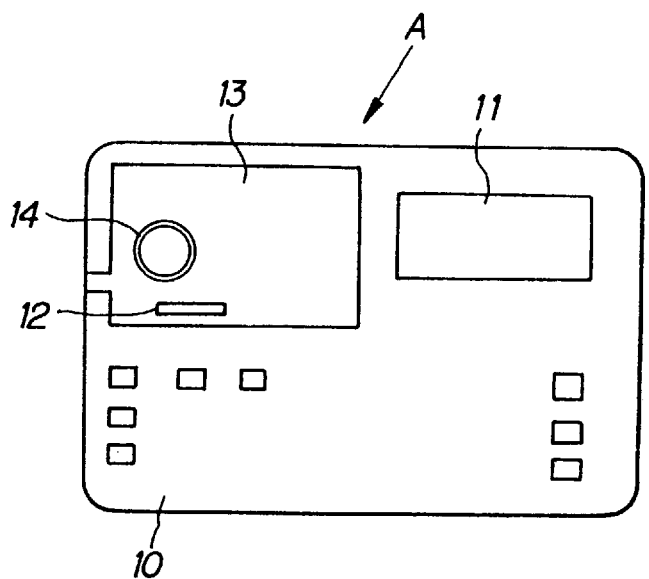
FIG. 6A is a schematic plan view illustrating one example of the thermal printer which can be used in a third process of the present invention.

For example, as shown in FIG. 6A, a thermal printer A which can be used in the third process, is equipped with a display section 11 comprising a keyboard 10 for input, a liquid crystal display or the like, a thermal head 12, a cartridge receiving section 13 and a feed roller, i.e., a platen 14. For the imprint obtained by sealing a mark or the like comprising a character, figure, symbol or combination thereof, which is determined by input from the keyboard 10, or input by the selection of a rotator or external input, the open cells in the surface of the stamp material are closed by the heat generation of the thermal head 12 to form the print image of the white-black reverse mirror image. Preferably, the thermal printer A suitably has the function of a label word processor equipped with a conventional thermal printer.

Figure 6B:
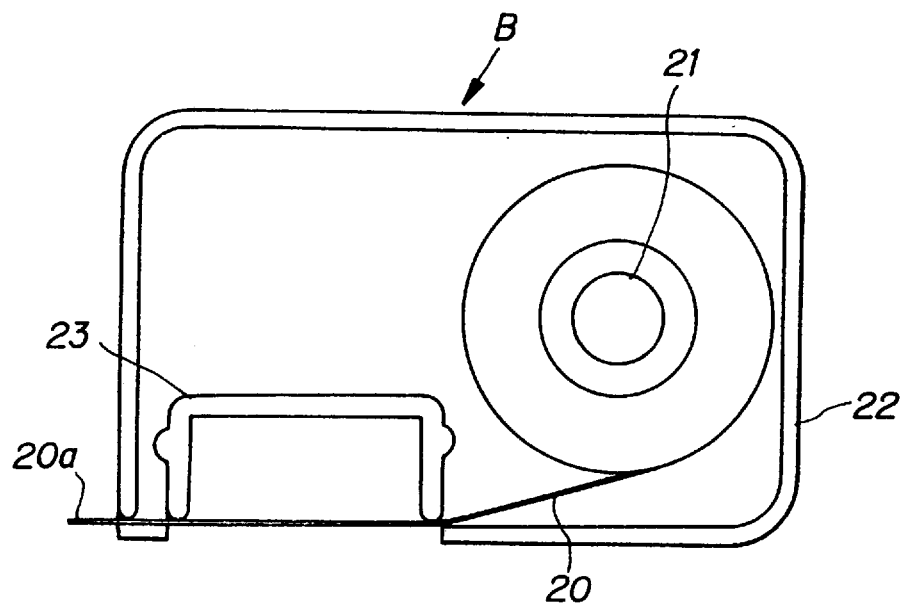
FIG. 6B is a schematic plan view illustrating one example of a stamp material cartridge of the present invention.

For example, as shown in FIG. 6B, a stamp material cartridge B of the present invention comprises a cassette case 22 receiving the roll of the stamp material obtained by winding the tape-like stamp material 20 around a core 21 so that the stamp material 20 can be fed, and the stamp material cartridge B is suitably interchangeable with a tape cartridge for labels which can be used in the conventional label word processor equipped with the thermal printer. Incidentally, reference numeral 23 is a guide member for the stamp material. In addition, the tape-like stamp material 20 does not have to possess a core.

The thermally meltable ink in the thermally meltable ink sheet, which can be used in the second process, can be prepared by dispersing a colorant in a thermally meltable material such as a wax, and the thermally meltable ink sheet can be prepared by coating a film having heat resistance, such as a polyester film, with a solution of a hot melt or an organic solvent and the above-mentioned thermally meltable ink dissolved therein. It is preferred that the back of the thermally meltable ink sheet is coated with an adhesion prevention layer containing a silicone resin. A typical example of the thermally meltable ink usually has a melting point of 60° to 170° C., which is higher than the melting temperature of the stamp material, and it is an ink which can be melted by the selective heat generation of the thermal head, can permeate into the surface layer of the stamp material, and can melt the surface layer of the stamp material. Furthermore, the ink preferably has a viscosity of about 100 mpa.s when melted. A colorant for the thermally meltable ink can be selectively used to produce a colorful imprint, not heretofore obtainable. The acceptable melting viscosity of the thermally meltable ink is in the range of about 10 to 200 mpa.s, and the viscosity can be selected in consideration of the ease of the permeation into the stamp material and the ease of the manufacture of the sheet.

In the first process of the present invention, the formation of the stamp surface on the stamp material is carried out by inputting and indicating the white-black reverse mirror image data of the desired characters, symbols, figures, and the like contained in the device from a keyboard or the like to obtain an external output, and then controlling the heat generation of the thermal head by this external output to partially melt the surface of the stamp material and to thereby form a concave ink-impermeable portion into which the ink does not permeate. In this case, the unmelted portion of the stamp material becomes the mirror image of the imprint in its original state on the surface of the stamp material.

That is to say, this melted portion becomes a stamp ink non-oozing portion because of the heat generation of the thermal head, and this melted portion is in a position where the stamp ink is neither absorbed nor transferred at the time of stamping. On the other hand, the unmelted portion is a stamp ink oozing portion where the ink is absorbed and oozed at the time of the stamping to form the imprint.

Specifically, the sponge sheet such as a foamed polyethylene sheet, is positioned between a platen roller and the thermal line head in a thermal printer, the platen roller also functioning as a feed roller. The platen roller is rotated in compliance with the heat generation of the thermal line head to form a white-black reverse mirror image of the imprint on the sponge sheet, thereby preparing the desired stamp.

In addition, in the situation where a plate-like platen is used, the polyethylene sheet is put on the plate-like platen, and the thermal head is then moved to prepare the stamp.

The space between the platen roller and the thermal line head can be set so as to be smaller than the thickness of the sheet-like stamp material, and the sheet can be compressed and deformed by heating to form a concave melted portion. The above-mentioned space is interrelated to heat generated by the thermal head, the heating speed and the apparent density of the stamp material, and so the space is set so that the depression of the melted portion may have a depth of 0.01 to 0.5 mm.

The depression depth depends upon the diameter of the cells in the stamp material, the porosity and the viscosity of the stamp ink, and even with a recess depth of about 0.01 mm, the stamp material can be used without problem, when the diameter of the cells is in the range of 2 to 10 $\mu$m and the viscosity of the stamp ink is 500 mpa.s or more. If the depression depth is too large, the unmelted portion is also affected, and the stamp cannot provide a sharp imprint with a fine character.

At this time, adhesion sometimes takes place between the thermal head and the stamp material, so that a good stamp cannot be prepared. This can be prevented by coating the surface of the sponge with a silicone resin. If coating with the silicone resin is not sufficient to prevent the problem, or if the silicone resin has an adverse effect on the stamp ink, a thin film sheet having an adhesion prevention effect can be interposed therebetween.

In the second process of the present invention, the formation of the stamp surface on the stamp material is carried out by superposing the thermally meltable ink sheet upon the surface of the stamp material, externally outputting desired white-black reverse mirror image data by a memory processor for desired imprint data, for example, using a word processor having a mirror image white-black reverse function, and then controlling the heat generation of the thermal head by this external output to melt the thermally meltable ink in the thermally meltable ink sheet. As a result, the molten ink permeates into the surface layer of the stamp material, and simultaneously the surface layer of the stamp material is partially melted by the heat of the molten ink to form a concave portion, with the result that a depression of the melted portion from the unmelted portion is 0.01 mm or more. The open cells of the stamp material in the melted portion are crushed and closed owing to the melting of the stamp material. Thus, on the surface of the obtained stamp, the melted portion becomes a portion through which the stamp ink included in the stamp material does not flow, and the unmelted portion of the stamp material which is not melted by the thermally meltable ink becomes a portion from which the ink included in the stamp material oozes. In consequence, at the time of stamping a desired imprint can be obtained with the ink oozed through this unmelted portion.

The second process of the present invention will be described in more detail with reference to FIG. 1B and FIGS. 2 to 4. A stamp material 1 having open cells is positioned together with a thermally meltable ink sheet 2 between the thermal line head 3 and the platen roller 4 in a thermal printer. At this time, the thermally meltable ink sheet 2 is laid on the side of the thermal head 3, and a thermally meltable ink coating layer a on the thermally meltable ink sheet 2 is laid on the surface side of the stamp material 1.

Furthermore, the space between the head 3 and the platen roller 4 is set so that the depression of a concave melted portion 6 from an unmelted portion 7 may be 0.01 mm or more. The depth of the concave melted portion is concerned with the heat of the head, a heating speed, the quality of the stamp material, the diameter of the open cells, the melting point of the stamp material, the density of the stamp material, and the like, but the surface layer of the stamp material can be melted up to a certain depth, while pressed and deformed. Therefore, as the molten ink permeate into the open cells, the open cells are completely closed. Thus, the complete close of the open cells is possible using a small amount of energy in contrast to a case where a heat transfer ink is used or a situation where the entire surface of the sponge is melted, and hence an influence on the unmelted portion is limited, so that the good stamp surface can be obtained. The platen roller 4 also has a function as a feed roller, and this platen roller is rotated in compliance with the heat generation of the thermal line head 3 to move the thermally meltable ink sheet 2 and the stamp material 1 having the open cells. At this time, the thermally meltable ink is melted on the surface of the stamp material 1 and it permeates into the sponge surface layer. Simultaneously, the melted surface portion of the stamp material 1 becomes a stamp ink non-oozing portion 6, and the unmelted portion of the stamp material 1 becomes a stamp ink oozing portion 7 which has a mirror image for an imprint thereon. In consequence, a stamp 5 is formed. In this case, as in the first process of the present invention, adhesion takes place sometimes between the head and the thermally meltable ink sheet, and so it is preferable to form an adhesion prevention layer containing a silicone resin on the back of the sheet.

A third process of the present invention is directed to a process for preparing a stamp by the use of a thermal printer A and a stamp material cartridge B as shown in FIG. 6.

That is to say, the stamp material cartridge B is received in a cartridge receiving section 13 of a thermal printer having a thermal head 12 capable of printing in a tape form, for example, a conventional label word processor, and a print image determined by input from a keyboard 10, input by the selection of a rotator or external input is confirmed on a display 11 such as a liquid crystal display. Afterward, printing is done on a stamp material 20 fed from the above-mentioned cartridge B by means of a thermal head 12 to prepare a stamp having a suitable length.

Figure 10:
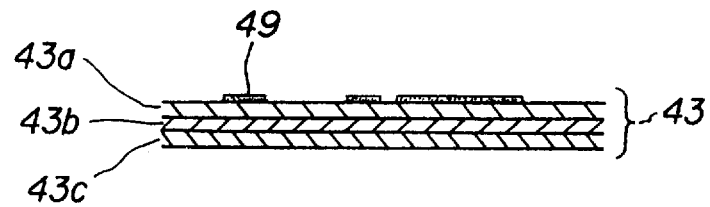
FIG. 10 is a sectional view illustrating one example of a conventional tape for the label.

A stamp print surface 20a in FIG. 6B and a display surface 43d of a label tape cartridge in FIG. 10 are laid on the same surface side. Furthermore, on the usual label tape, a positive character or the like is usually printed, but in the case of the present invention, the stamp material 20 is heated by the thermal head 12 so as to obtain a white-black reverse mirror image to an imprint, so that the surface of the stamp material is melted and the open cells are closed. The thermal printer A is equipped with a function capable of forming a selectable print image of the positive image or the mirror image white-black reverse, and this can be determined by hand or can be determined beforehand in the case that the cartridge has a sensor. When the mirror image is only used, and the white-black reverse is not used, a white imprint can be obtained. Furthermore, when a problem of adhesion takes place between the head and the stamp material, it is effective to directly form an adhesion prevention layer on the stamp material or to interpose a thin film sheet having an adhesion prevention effect between the head and the stamp material.

Alternatively, the thermally meltable ink sheet can be wound up in the cartridge and fed with the feed of the stamp material.

As in the case of a conventional stamp, the stamp of the present invention can be repeatedly used without replenishing the ink after the stamp material has been permeated with the ink or the ink has been absorbed by the stamp material. In the present invention, however, the quality of the print surface can be improved by forming the concave melted portion, and even if repeatedly used without replenishing the ink, the stamp of the present invention can characteristically provide a sharp print.

In the preparation process of the present invention, the print surface of the stamp can be directly formed on the stamp material itself by the use of the thermal head, and hence some intricate steps can be omitted.

Furthermore, when characters, symbols and figures are input to the word processor, a heat generation signal is sent to the thermal line head of the printer by its internal processing, and the direct printing of the mirror image white-black reverse is possible. Therefore, any especial artwork is not necessary. Moreover, the thermal printer which can move a plastic sheet having the open cells and the thermal line head relative to each other can be connected to the above-mentioned word processor, whereby the stamp of the present invention can be prepared. If the characters or the like to be printed are contained or prepared in the word processor, heat is not generated for dots other than required, and so the stain-free high-quality stamp can be obtained. As is conventional, when an optical treatment is accomplished by the use of the artwork, dust and scratches are serious problems, but in the present invention, by controlling the only cleanness on the thermal head, the high-quality stamp can be obtained, which permits the remarkable cost reduction of the stamp. In case the sliding properties between the thermal head and the stamp material are poor, the surface of the sheet can be coated with silicone, or a PET film coated with silicone can be interposed between the sheet and the thermal head to assure the preparation of the stamp.

In the stamp preparation process of the present invention, waste materials are not present, which is economical and environment desirable. The width of the stamp is limited, but in the longitudinal direction, where manufacture of an elongated stamp was previously impossible without high cost, the easy manufacture is possible. In addition, since a character size and arrangement are programmed beforehand for labels, a stamp having a good appearance can be easily obtained. When the stamp manufactured by such a process is permeated with the stamp ink, continuous stamping is possible. This stamp ink, which does not volatilize at ordinary temperature and which has a viscosity of 100 to 3000 mPa.s shows a preferable stamping performance. If the viscosity is less than this range, the ink is easily blurred and the imprint is unclear. On the other hand, if the viscosity is too high, the permeation takes a long time, and at the time of the stamping, the flow of the ink is poor, so that an excessively large force is required and a sharp imprint cannot be obtained.

Furthermore, by providing a permeable material having a higher degree of foaming than the stamp material at the rear of the stamp material, the life of the stamp can be prolonged and the replenishment of the ink can be easily carried out.

The surface of the stamp obtained by the preparation process of the present invention is printed and becomes the print surface, and even if the print surface is not combined with another part, it has an advantage that it functions as the stamp. However, preferably, the print surface can be mounted on a mount to obtain the usual stamp. With regard to its use, the stamp is permeated beforehand with ink or ink is beforehand contained in the stamp, whereby sharp printing can be repeatedly carried out without replenishing the ink for a long period of time. The ink with which the stamp is permeated preferably has no volatility at ordinary temperature and has a viscosity of 100 to 3000 mpa.s, and such an ink shows a preferable stamping performance.

Furthermore, when a stamp ink permeating material having a higher degree of foaming than the stamp material of the stamp is provided between the stamp and the block, the life of the stamp can be prolonged, and the stamp ink can be easily replenished.

When the stamp of the present invention is mounted on the surface of a roll, a continuous print is also possible.

Also, when the thermally meltable ink is melted on the surface of the foamed polyethylene sheet by the thermal head, so that the foamed polyethylene sheet may be permeated with the molten ink, and so that the stamp material may be melted by the molten ink, the stamp can be manufactured by the usual word processor with the same operation.

According to the present invention, the stamp can be prepared by the usual word processor and the usual operation without using a specific device whose handling is intricate and which requires skill, even when any manuscript is not present. Additionally, when a scanner and a thermal head are used, the plate can be prepared only by scanning the manuscript, depending upon the constitution of the device. Needless to say, the plate can also be prepared by combining both the scanner and the thermal head.

In the third process of the present invention, the tape-like stamp material is wound up in the form of a roll in the cartridge receiving section of the thermal printer and received in a cassette case so that the stamp material may be fed. For a desired imprint set by input to the thermal printer or by external input, the white-black reverse mirror image is printed on the surface of the stamp material fed from the above-mentioned cartridge by the thermal head to form a print surface, whereby the stamp having a suitable length is prepared. By the same procedure as in the case where a usual label tape is made, the print plate for the stamp can be prepared, and the open cells in the surface easily closed only as necessary.

Figure 9:
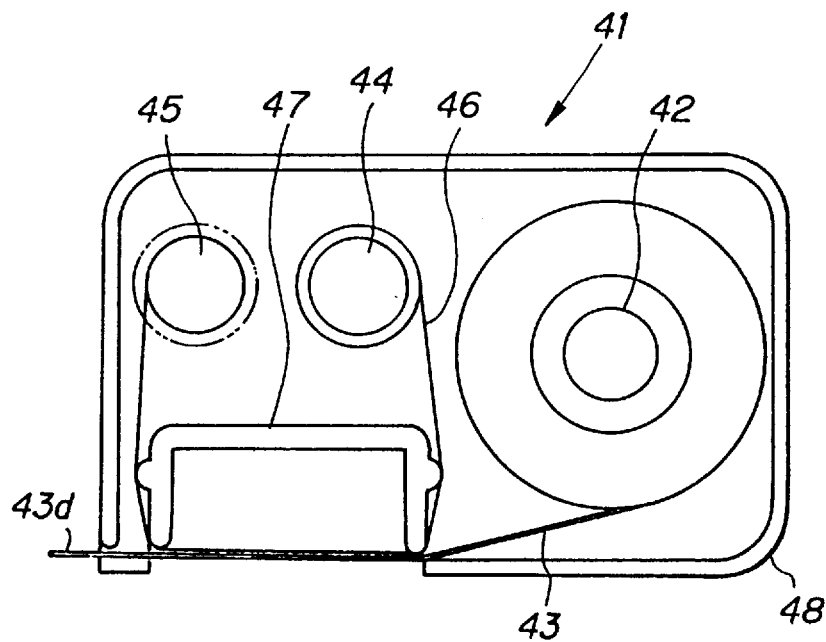
FIG. 9 is a schematic plan view illustrating one example of a conventional tape cartridge for a label.

In addition, the cartridge for the stamp material of the present invention is made to be received in the cartridge receiving section of the thermal printer having the thermal head capable of printing in a tape form, and so its handling is the same as the preparation of the usual label tape. In the structure of the cartridge, a label tape 43 shown in FIG. 9 may be replaced with a tape-like stamp material, and the heat transfer ink ribbon may be replaced with a thermally meltable ink ribbon. In this case, even if the thermally meltable ink ribbon is not present, stamp preparation is possible by the combination of the head and the stamp material.

A process for preparing a stamp of the present invention comprises simple steps and requires no mold, and therefore a high-quality stamp can be promptly provided. Furthermore, since the stamp having a colorful print surface can be prepared, an easily recognizable stamp can be obtained. In the stamp obtained by the preparation process of the present invention, the surface of the stamp itself is engraved to become a print surface, and the thus obtained print surface conveniently functions as the stamp, even if not attached to another part, but in general, it is attached to a mount to form the stamp. The stamp material of the stamp having open cells can absorb an ink, and so the stamp of the present invention conveniently applies ink every time the stamp is used, which advantage is similar to the conventional stamp having open cells. However, an imprint obtained by the use of the stamp of the present invention is characterized by being sharp and of high-quality. In addition, a desired print surface can be instantaneously prepared by the same device and operation as in a usual word processor, and the high quality stamp can be provided.

In particular, if a tape-stamp material is received in a cartridge which can be mounted on a label word processor equipped with the usually commercially available thermal printer so that the plate can be made from tape-like stamp material by the thermal head, the stamp having the same pattern as the label tape can be prepared. In addition, the practical range of the conventional label word processor can be increased, and since the stamp material is in the form of a tape, the fair degree of freedom is present for the determination of its length. Thus, there can be provided a preparation process which can prepare a stamp larger than has previously been possible.

EXAMPLES

Next, the present invention will be described with reference to examples on the basis of drawings.

Example 1

As a stamp material, a foamed polyethylene sheet was used which had a steric net structure, an average open cell diameter of 5 $\mu$m, a porosity of 60%, a melting point of 70° C. and a thickness of 1.6 mm. A word processor and a thermal printer connected thereto were prepared, and the output of the word processor was set to a mirror image and a white character.

Figure 2:
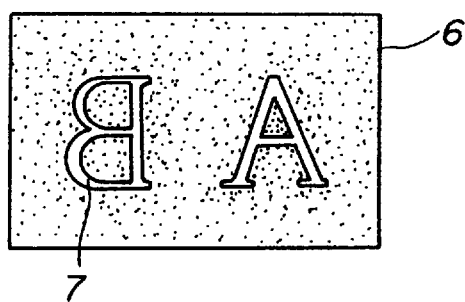
FIG. 2 shows a foamed polyethylene sheet on which engraving is provided.

FIG. 1A shows the thermal printer. The stamp material comprising the foamed polyethylene sheet was positioned between a thermal line head 3 and a platen roller 4, and the platen roller 4 also had a function as a feed roller. This platen roller 4 was rotated in compliance with the heat generation of the thermal line head 3, so that a concave melted portion was partially formed on the stamp material 1. Thus, this concave melted portion became a stamp ink non-oozing portion 6, and the unmelted portion became a stamp ink oozing portion 7 constituting the mirror image of an imprint, thereby obtaining a stamp 5. In this case, a space between the thermal line head 3 and the platen roller 4 was set so as to be smaller than the thickness of the stamp material 1, so that open cells adjacent to each other in the stamp material 1 were densified, with the result that the heat output of the heat element could be controlled so as not to be too large and the stamp material 1 could be melted to a certain depth to form the concave portion. In consequence, the closure of the open cells became complete and the influence of the heat generation was prevented from spreading to surrounding portions. As a result, the sharp imprint could be obtained. Here, the stamp material having a width of 24 mm was used, and the stamp was formed under conditions such that the thermal head was pressed against the platen roller under a force of 800 g to form a concave portion of 0.05 mm. At this time, the temperature of the heat generated from the head was in the range of about 200° to 300° C., and the stamp formation speed was 30 mm/s. The diameter of the open cells in the stamp material was 5 $\mu$m, and hence the open cells of about 10 layers were densified, so that a sufficient sealing performance could be obtained. Furthermore, in order to prevent adhesion between the thermal head and a stamp material, the surface of the stamp material was thinly coated with a thin silicone resin, so that the good stamp surface could be obtained. FIG. 2 shows an example of the thus obtained stamp surface, and reference numeral 6 is a stamp ink non-oozing portion melted to be concave, and numeral 7 is the mirror image of the imprint comprising a stamp ink oozing portion of the unmelted portion.

The thus obtained stamp was attached to a mount to prepare such a stamp as shown in FIG. 3.

FIG. 4 shows the imprint obtained by using the stamp, and when a stamp size is 25 mm×25 mm, a stamping force is about 500 g, the stamp is scarcely deformed. In this case, when the depth of the melted concave portion is 0.01 mm or more, the ink neither permeates into the melted portion of the stamp material nor blurs on the paper when the stamp is used, so that the good imprint can be obtained. Thus, the imprint is scarcely affected, even if the ink permeates into the melted portion of the stamp material during storage. In addition, even if the stamp is replenished with the ink through the stamp surface, there is an advantage that a small number of trial stamping operations is enough.

However, if the depth of the melted concave portion is 0.1 mm or more, it is difficult to duplicate a fine line or dot on the stamp and the imprint is unclear. However, in the case of a large character, if the step is 0.5 mm, there is no problem, depending upon a combination of the stamp material and the head.

Example 2

Figure 1B:
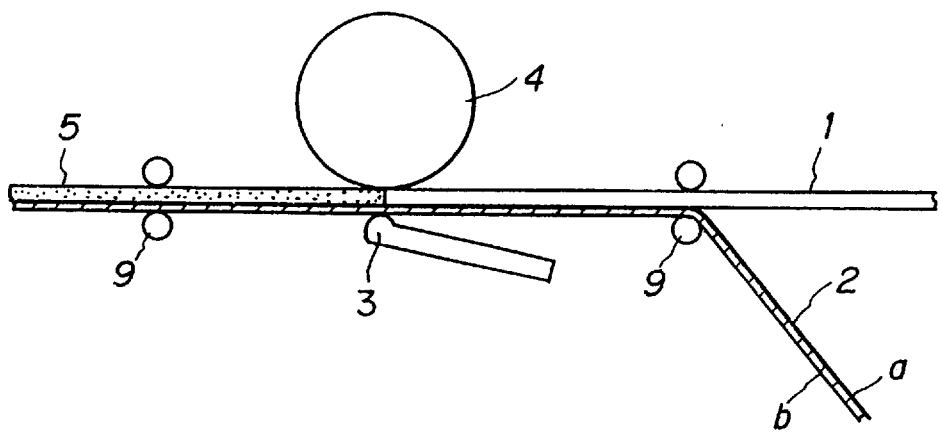

FIG. 1B shows a thermal printer connected to a word processor having a mirror image white-black reverse function.

A thermal line head 3 for generating heat at a temperature of 200° to 300° C. which was installed in this thermal printer was pressed against a platen roller 4 under a force of 800 g. Between the thermal line head 3 and the platen roller 4, there was positioned a stamp material 1 (a foamed polyethylene sheet) (thickness=1.6 mm) having a steric net structure of fine open cells, an average open cell diameter of 5 µm, a porosity of 60% and a melting point of 70° C. on which a thermally meltable ink sheet 2 [a PET film (thickness=3.5 µm) was coated as thick as about 3 µm, with a thermally meltable ink a mainly comprising wax and carbon and having a melting temperature of 100° C. and a melting viscosity of 100 mpa.s, and the surface of the PET film facing the head was coated with silicone] was superposed. The platen roller 4 also had a function as a feed roller. This platen roller 4 was rotated in compliance with the heat generation of the thermal line head 3, and the thermally meltable ink sheet 2 and the stamp material 1 were moved at a speed of about 30 mm/sec, whereby the thermally meltable ink a on the thermally meltable ink sheet 2 was melted and allowed to permeate into the surface of the stamp material 1, and simultaneously the surface layer of the stamp material 1 was melted and densified to become a stamp ink non-oozing portion 6. On the other hand, a portion which was not melted by the thermally meltable ink became a stamp ink oozing portion 7 constituting the mirror image of an imprint, whereby a stamp 5 was formed. A depression of the stamp ink non-oozing portion 6 from the stamp ink oozing portion 7 of the thus obtained stamp 5 was 0.03 mm. In this case, the stamp material is melted and densified via the thermally meltable ink, and therefore the depression is smaller than that of Example 1.

When the thermally meltable ink was only transferred to the surface of the sheet, it was difficult to completely close the open cells. Therefore, in the present invention, the melting point of the thermally meltable ink is higher than the melting point of the stamp material, and for the purpose of obtaining a depression of 0.01 mm or more, the foamed polyethylene sheet 1 was melted, while pressed and deformed, to simultaneously carry out the melting and permeation of the thermally meltable ink a (c in FIG. 5) and the melting of the surface layer of the foamed polyethylene sheet 1 (d in FIG. 5). When compression was applied, not only the surface but also a portion below the surface to a certain depth of the polyethylene sheet 1 was melted and densified, so that the enclosure of the open cells became complete with the aid of the permeated molten ink, and the depression was simultaneously formed. In consequence, the stamp ink non-oozing portion 6 was scarcely permeated with the stamp ink when the stamp was used, so that the unevenness of the imprint due to uneven stamping force was decreased and a stamp which was excellent in handling could be obtained.

Thus, a portion where the thermal head generates heat is the ink non-oozing portion, i.e., a portion where the ink is not transferred when the stamp is used. FIG. 2 shows an imprint mirror image on the thus obtained stamp surface. The thus obtained stamp 5 is the attached to a mount 8 to prepare a stamp, which is shown in FIG. 3. FIG. 4 shows an imprint obtained by putting the stamp. FIG. 5 is an enlarged sectional view of the stamp surface, and c is a portion permeated with the thermally meltable ink and d is a melted portion.

Example 3

A third process of the present invention will be described.

A stamp is prepared by the use of a thermal printer A and a stamp material cartridge B (refer to FIG. 6).

That is to say, the stamp material cartridge B is received in a cartridge receiving section 13 of a thermal printer having a thermal head 12 capable of printing in a tape form, for example, a conventional label word processor, and a print image determined by input from a keyboard 10, input by the selection of a rotator or external input is confirmed on a display 11 such as a liquid crystal display. Afterward, printing is carried out a stamp material 20 fed from the above-mentioned cartridge B by a thermal head 12 to prepare a stamp having a suitable length.

In this embodiment, a stamp surface 20a in FIG. 6B and a display surface 43a of a label tape cartridge in FIG. 10 are laid on the same surface side. Furthermore, on the usual label tape, a positive character or the like is usually printed, but in the present invention, the stamp material 20 is heated by the thermal head 12 so as to obtain a white-black reverse mirror image to an imprint, so that the open cells in the surface of the stamp material are melted and closed. The thermal printer A is equipped with a function capable of forming a selectable print image of a positive image or a mirror image white-black reverse, and this can be determined by hand or can be determined beforehand when the cartridge has a sensor. When the white-black reverse is not done, an imprint is a white character.

Figure 7A:
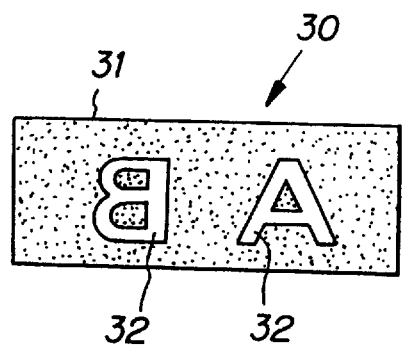
FIG. 7A is a plan view illustrating one example of a stamp engraved by the third process of the present invention.
Figure 7B:
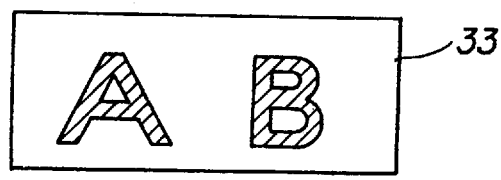
FIG. 7B is a plan view showing its imprint.

FIG. 7A shows a stamp 30 prepared by the third process, and this stamp 30 comprises an ink non-oozing portion (a portion melted by heat generated by the head) 31 in which a portion of the surface of the stamp material is melted and the open cells closed by the heat generated by the thermal head, and an ink oozing portion (an unmelted portion corresponding to the non-heat generation portion of the head) 32 which becomes a print image portion. In addition, FIG. 7B shows an imprint 33 printed by the above-mentioned stamp 30.

In this embodiment, the label word processor was used which had a head heat temperature of 200° to 300° C., a print speed of 30 mm/sec and a label tape thickness of 0.1 to 0.2 mm, thereby forming a stamp material (a foamed polyethylene sheet) having a steric net structure of fine open cells, an average open cell diameter of 5 $\mu$m, a porosity of 60%, a melting point of 70° C. and a thickness of 1.6 mm. In order to make the above-mentioned sheet having a thickness of 1.6 mm from this tape having a thickness of 0.1 to 0.2 mm in the label word processor, the stamp material was heated while compressed as much as about 30% in its thickness direction. Thus, in not only the surface but also a portion below the surface to a certain depth of the stamp material, the material was melted and the open cells were closed, so that a depression of the melted portion from the unmelted portion was about 0.05 mm, with the result that a good imprint could be obtained. The force of the head against the stamp material having a width of 24 mm was about 1000 g. Moreover, in order to improve sliding properties between the thermal head and the stamp material (the foamed polyethylene sheet) at the time of the heat generation, a PET film having a thickness of 1.5 $\mu$m in which the surface facing the head was coated with silicone was interposed between the above-mentioned stamp material and the head, and as a result, the sliding properties could be remarkably improved. In addition, the surface of the PET film facing the stamp material was coated with the thermally meltable ink, and therefore, in the heat generating part of the head, the thermally meltable ink was melted, and the stamp material was permeated with the molten thermally meltable ink, so that the surface were melted and densified by the heat of the ink and the open cells were closed. In consequence, the good effect of the melting and the closing of the open cells in the stamp material was obtained.

As described above, in this embodiment, the thermal printer having the function of the conventional label word processor is used, and the tape-like stamp material is wound up in the form of a roll so that it can be fed. Furthermore, this roll is received and used in the cartridge interchangeable with the tape cartridge for labels made in the thermal printer. That is to say, the stamp can be easily prepared by the same procedure as in the manufacture of a label tape by a conventional label word processor except that the stamp material cartridge B is substituted and a white-black reverse mirror character is set. In addition, the stamp material cartridge in this embodiment has a structure in which the stamp material can be received in the cartridge receiving section of the thermal printer capable of printing in a tape form, and so handling is as easy as in the case of manufacturing the conventional label tape.

Figure 8:
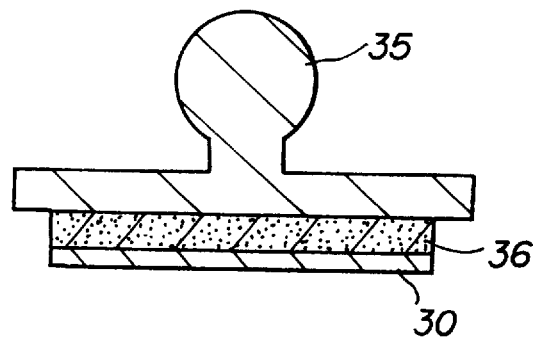
FIG. 8 shows one example of the stamp in use, a sectional view illustrating the stamp attached to the mount.

FIG. 8 shows one example where the thus prepared stamp 30 is attached to a mount 35.

If the thickness of the stamp 30 is about 3 mm, the stamp 30 can be continuously used for stamping about several thousands times, once the stamp material is permeated with the ink. In this embodiment, however, the material is thin, the number of the possible stamping is small, and so an ink absorbing pad 36 is superposed upon the stamp. In this case, the stamp 30 and the ink absorbing pad 36 are attached to each other by sticking a double-coated tape on their peripheries, and the ink absorbing pad 36 and the mount 35 are also attached to each other by the double-coated tape.

The thus prepared stamp can easily be attached to a stamp grip such as the above-mentioned mount, and it can be promptly used for printing such as continuous stamping.

Therefore, the stamp can be very rapidly prepared by introducing the stamp material cartridge of the present invention into the label word processor equipped with the thermal printer, and so the present invention has an advantage that several days are not required for the manufacture of a stamp after receipt of an order, in contrast to the present situation.

Furthermore, in the present invention, steps of the preparation of a negative from an original, plate-making, the preparation of a matrix, rubber baking; and finishing are not required, in contrast to the case of the manufacture of a rubber stamp. In addition, expensive facilities are not required in contrast to a laser sculpture, and so the stamp can be prepared at low cost. Particularly, in the case of a long stamp, this effect is significant.

The third process and the stamp material cartridge for use therein are constituted and used as described above, but they are not limited to the above-mentioned examples and their designs can be changed to various embodiments, so long as the gist of the present invention is not changed. For example, no particular restriction is put on the tape-like stamp material, the structure of the stamp material cartridge and the like, so long as the tape-like stamp material is wound up in the form of a roll and received in a cassette case so that the stamp material may be fed, and the stamp material cartridge receiving the cassette case can be installed in the cartridge receiving section of the thermal printer having the thermal head capable of printing in a tape form. In addition, no particular restriction is put on other constituent members of the thermal printer, so long as a print image such as a mark set by input from a keyboard or external input is printed on the stamp material fed from the above-mentioned cartridge by the thermal head, and a stamp having a suitable length can be prepared.

What is claimed is:

1. A combination stamp material cartridge and stamp material, the combination for preparing in a thermal printer a stampable image on a stamp surface of an ink absorbing stamp, the combination comprising:

a cassette case forming the housing for the cartridge; and a quantity of stamp material in the cassette case, wherein the quantity of stamp material is a stamp ink-permeable tape-like elastic material having open cells and wherein a portion of the quantity of stamp material can be selectively fed from the cartridge.

\* \* \* \* \*